March 17, 1942.  C. E. QUINN  2,276,872
THERMOSTATIC CONTROL MEANS
Filed April 26, 1941  2 Sheets-Sheet 1
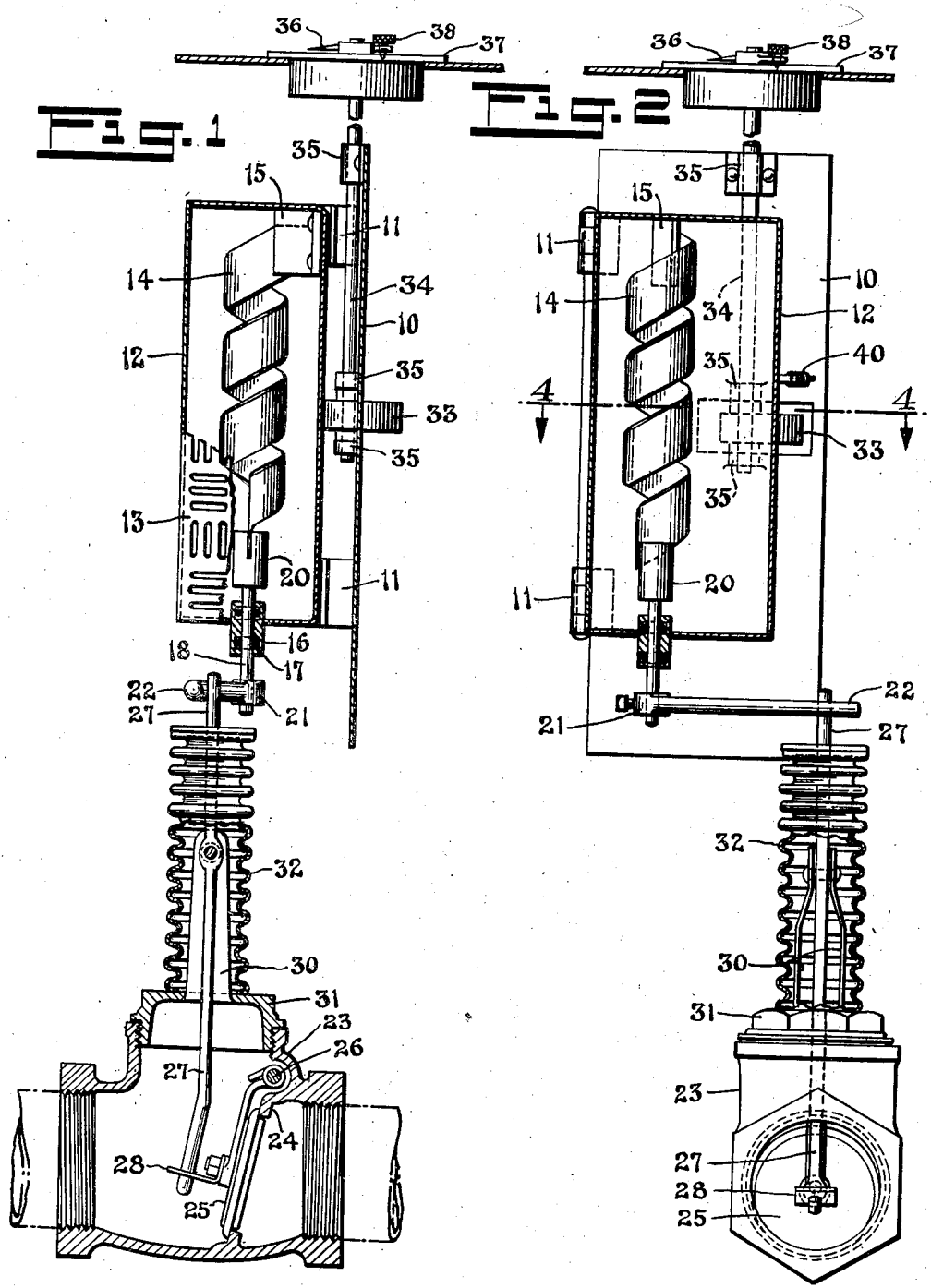
INVENTOR.
Clara E. Quinn
BY Darby + Darby
ATTORNEYS March 17, 1942.  C. E. QUINN  2,276,872
THERMOSTATIC CONTROL MEANS
Filed April 26, 1941  2 Sheets-Sheet 2
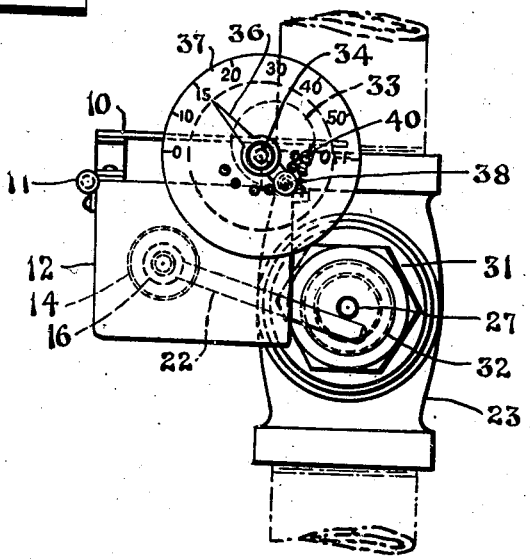
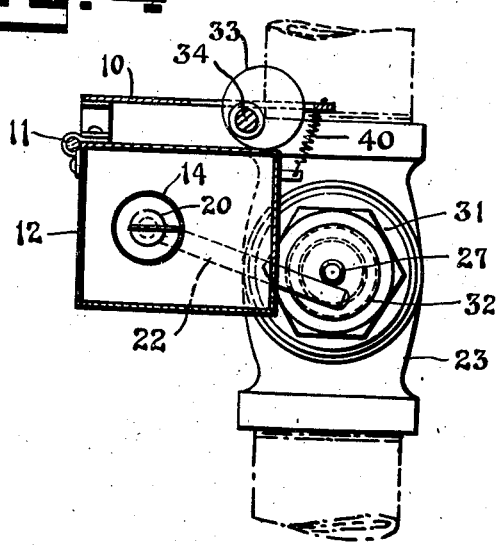
INVENTOR.
Clara E. Quinn
BY Darby & Darby
ATTORNEYS Patented Mar. 17, 1942

2,276,872

UNITED STATES PATENT OFFICE 2,276,872

THERMOSTATIC CONTROL MEANS

Clara E. Quinn, St. Petersburg, Fla., assignor to Broquinda, Inc., St. Petersburg, Fla., a corporation of Delaware Application April 26, 1941, Serial No. 390,451

2 Claims. (Cl. 236—101)

The present invention relates to thermostatic control apparatus, and particularly to thermostatic control apparatus for controlling the flow of a refrigerating medium.

More particularly still, in its preferred embodiment, the invention relates to a thermostatic means for controlling the flow of a fluid secondary refrigerating medium.

It is an object of the invention to provide a means, thermostatically governed, for controlling the setting of a valve or the like which in turn controls the flow of a refrigerating medium. It will be understood, of course, that this device might control a valve which in turn controls the flow of a heating medium, and that by describing the invention as applied to the control of refrigeration, it is not intended to limit it thereto.

It is another object of the invention to provide a control means which may be readily adjusted to maintain the control temperature at a desired point.

It is a further object of the invention to provide such a thermostatic control means which is inexpensive and which is at the same time reliable in operation.

Other objects and features of the invention will appear when the following specification is considered together with the annexed drawings, in which Figure 1 is a vertical, cross-sectional view of the control device of the invention as applied to a valve herein considered to be a valve in the flow line of a refrigerating system.

Figure 2 is a front elevation, with portions broken away, of the device of Figure 1, again showing the relationship of that device to the valve structure upon which it operates.

Figure 3 is a top plan view of the thermostatic control mechanism and of the valve controlled thereby, showing particularly the means by which the thermostatic control element is set to a desired temperature value; and Figure 4 is a horizontal cross-section, taken on the line 4—4 of Figure 2, showing particularly the mode by which the setting of the thermostatic element may be adjusted.

Referring now to the drawings, there is mounted upon a plate 10, through the medium of the hinges 11, a box-like structure 12 having a perforated cover 13. This entire unit is mounted within the space which is refrigerated. Mounted within the box-like structure 12 is a bi-metal thermostat unit 14 which is formed in the shape of a helix, the upper end being fastened as by welding to a bracket 15 which is in turn fastened to the rear of the box 12.

At the lower end of the box 12 there is supplied a sleeve 16 supplied with bearings 17, preferably ball bearings. Rotatably mounted in the ball bearings 17 is a shaft 18 which is enlarged at its upper end to form a slotted head 20. Into the slot in the head is inserted a projection of the end of the helical bi-metal element 14. On the lower end of the shaft 18 there is fastened, by means of the set screw 21, an arm 22 which arm extends outwardly or to the right, as seen in Figure 2, and lies against the extending stem of the controlled valve.

In the present instance this valve, as best seen in Figure 1, comprises the valve body 23 having the annular seat 24 therein. Cooperating with this seat is the flap 25 which is pivoted at 26 and which is controlled by means of the rod 27 which extends through a hole in the bracket 28. Rod 27 extends upwardly and is pivoted at a point considerably above the valve on a pivot extending between the upright supporting arms 30 which are made integral with or fastened to the valve cap 31.

Fastened to the valve cap 31 and to the valve rod 27 is a flexible bellows 32 which serves to isolate the interior of the valve from the exterior thereof, thereby making it unnecessary to utilize a gland packing where the valve rod 27 passes through the valve cap 31. It will be seen that when the thermostatic element 14 is subjected to an increased temperature it tends to expand and to thereby rotate the shaft 18 in a counter-clockwise direction, thus causing the valve flap 25 to be moved from its seat and to permit the flow of fluid through the pipe lines connected to the valve. Of course when the thermostatic element is subjected to a lower temperature the reverse action occurs.

In order that the valve setting may be in accordance with the temperature desired, there is supplied a means for adjusting the thermostatic element 14 with respect to the initial degree of contraction thereof. This means comprises a cam 33 which bears against the rear surface of the box 12 to cause rotation of the box upon its hinges 11. Cam 33 is mounted upon a shaft 34 which is supported in brackets 35 on the plate 10, the shaft extending upwardly to any desired position, but ordinarily to a position outside the refrigerated space.

Shaft 34 carries on its upper end a pointer 36 which cooperates with a dial 37 graduated as shown in Figure 3. The pointer 36 is provided with a spring pressed plunger 38 which cooperates with holes 40 in the dial 37 to lock the shaft and cam in adjusted position. It will be obvious that by rotating the pointer 36 to any desired position, the cam being rotated to a corresponding position will cause the box 12 to swing upon its hinges, thereby determining the amount of contraction of the thermostatic element 14 which will be initially present. It will be seen that the valve throttles the flow of refrigerating medium at all times except when the pointer is at its off position, at which time the helical bi-metal element is so expanded as to be ineffective to operate the valve. Box 12 is held against the cam 33 by means of spring 41, which is stretched between plate 10 and a stud extending from box 12.

While I have described a preferred embodiment of my invention, it is to be understood that the invention may be utilized with other types of valves and further that other similar forms of thermostatic control means may be utilized in the same manner. Thus I do not wish to be limited by the foregoing description of my invention, but on the contrary wish to be limited only by the appended claims.

What is claimed is:

1. In a thermostatic control means, in combination, a mounting plate, a box-like structure hingedly mounted on said plate, a helical bi-metal element mounted in said box with its upper end fixed thereto, a shaft attached to the lower end of said element and rotatably mounted in the lower portion of said box-like structure and operable by said bi-metal element, said shaft being adapted to operate a valve, a cam rotatably mounted on said mounting plate in position to cause said box to pivot about its hinges, resilient means for retaining said box against said cam, and means comprising a dial and pointer for rotating said cam to adjust the tension of said helical bi-metal element.

2. In a thermostatic control means, in combination, a mounting plate, a box-like structure hingedly mounted on said plate, a helical bi-metal element mounted in said box with its upper end fixed thereto, a shaft attached to the lower end of said element and rotatably mounted in the lower portion of said box-like structure, an enlarged portion on the inner end of said shaft slotted to receive the lower end of said bi-metal element, an arm on the outer end of said shaft, said arm extending into cooperative relationship with the controlling element of a valve, and means comprising a cam and cam shaft mounted on said mounting plate and bearing against the rear of said box-like structure for rotating said box-like structure upon its hinges to alter the relationship of said arm to the valve controlling element and to tension said helical bi-metal element to a desired degree.

CLARA E. QUINN.